United States Patent [19]

Ogden et al.

[11] Patent Number: 5,551,920
[45] Date of Patent: Sep. 3, 1996

[54] MOTION BASE

[75] Inventors: Andrew M. Ogden, Pasadena; Alexander Burkat, Placentia; Jon H. Snoddy, Pasadena; Edward Fritz, Valencia, all of Calif.

[73] Assignee: The Walt Disney Company, Burbank, Calif.

[21] Appl. No.: 267,787

[22] Filed: Jun. 28, 1994

[51] Int. Cl.$^6$ .................................................. A63G 31/16
[52] U.S. Cl. ................................ 472/59; 472/130; 434/55
[58] Field of Search ................................ 472/59, 57, 130, 472/136, 137, 36, 40; 434/55, 59

[56] References Cited

U.S. PATENT DOCUMENTS

| | | | |
|---|---|---|---|
| 4,251,140 | 2/1981 | Fogerty, Jr. | 472/60 X |
| 4,303,236 | 12/1981 | Czarnecki | 472/60 |
| 4,824,099 | 4/1989 | Rusu et al. | 434/55 X |
| 4,995,603 | 2/1991 | Reed | 472/60 |

*Primary Examiner*—Kien T. Nguyen
*Attorney, Agent, or Firm*—Fish & Neave; Jeffrey H. Ingerman

[57] ABSTRACT

A motion base for an apparatus for subjecting a user to sensory experience is provided. The motion base has a motion generator for moving a platform about at least one axis of rotation. The platform supports the user such that the user's center of gravity is substantially coincident with the center of rotation of the platform. The active elements of the motion generator are separate from the elements that support the weight of the apparatus and the user.

11 Claims, 5 Drawing Sheets

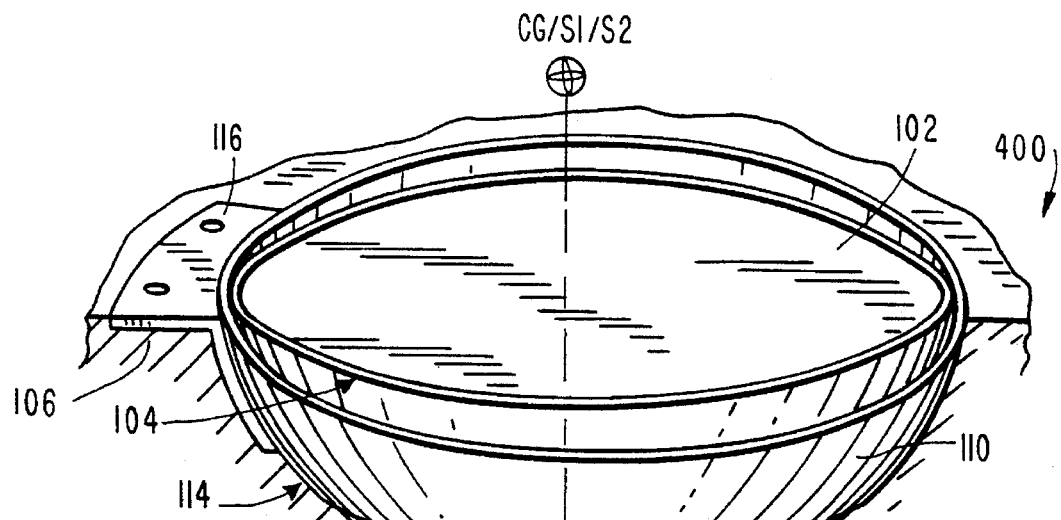
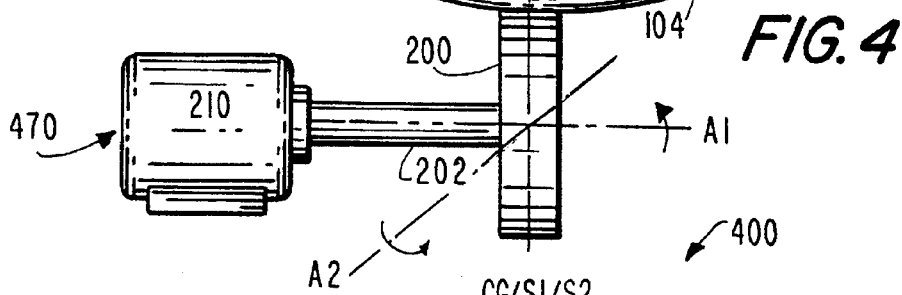
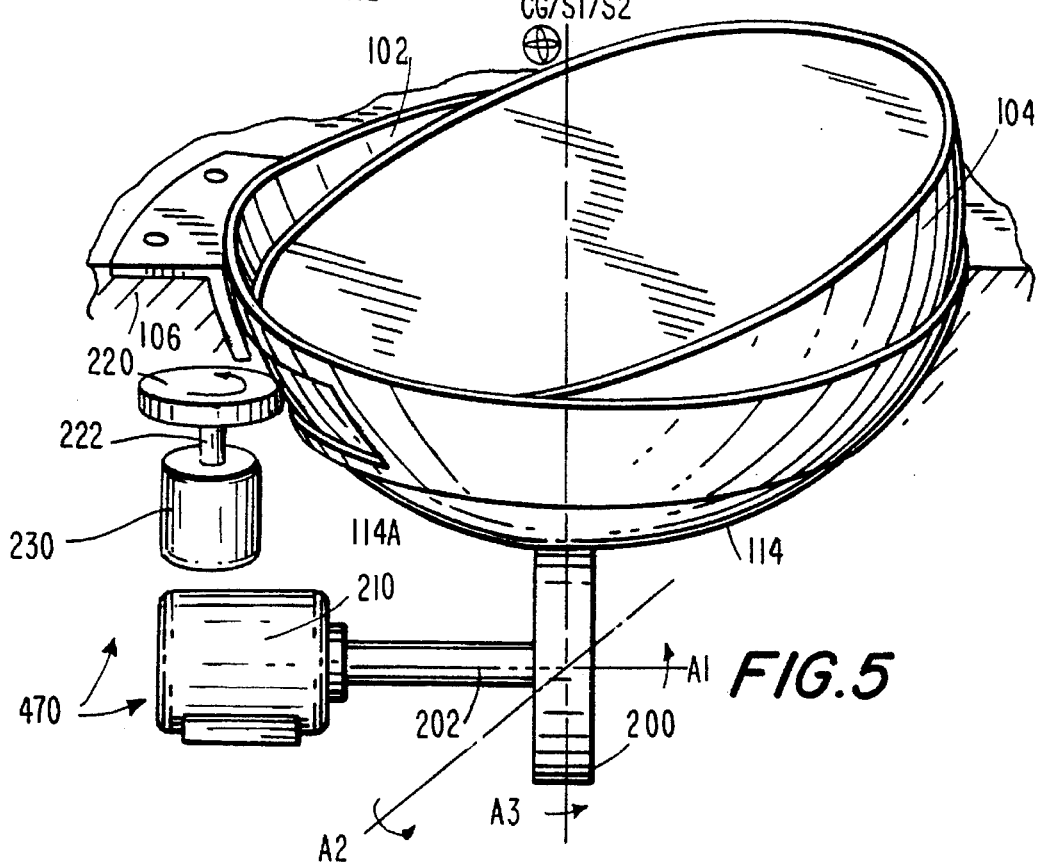
FIG. 4
FIG. 5

MOTION BASE

BACKGROUND OF THE INVENTION

This invention relates to a motion base for an apparatus for subjecting a user to sensory experience. In particular, this invention relates to a motion base for use in virtual reality or other simulator-type theme park attractions.

"Virtual reality" is a phrase that has been used to describe the experience of living or playing in a computer simulated environment which models a three dimensional ("3-D") virtual space (i.e., a virtual world). In virtual reality systems, a viewer typically dons a set of goggle-mounted video screens or some other form of head-mounted device on which the viewer sees images of virtual world scenes. In addition, the user may be able to interact with objects in the virtual world by maneuvering a pointing device which is typically gripped by the hands. Through the pointing device, the user is thus able to actively influence and participate in events in the virtual world.

Virtual reality systems incorporating visual images and user input have been extensively used in military and commercial applications, such as flight simulators. Virtual reality systems may also be used in entertainment applications including computer games, video arcade games and theme park attractions.

In applications such as virtual reality theme park attractions, it is particularly important for the motion imparted to the apparatus of the attraction, and hence to the user, to correspond realistically to the user's input from the pointing device, thereby enhancing the user's sense of immersion in the virtual world.

Known motion bases for virtual reality and other simulator-type attractions generally include apparatus having some type of stationary platform from which the user enters the apparatus and as many moving parts as are necessary to carry out the type of motion suitable to the theme of the particular attraction.

The moving parts of such an apparatus can experience movement relative to each other and relative to the stationary platform. As a result, such attractions may pose safety concerns for their users. For example, the relative movements of the various component parts of the apparatus with respect to the stationary platform could leave enough open space for a hand or foot of a user, either on the stationary platform or the moving platform, to become caught therebetween.

Flexible coverings or skirts have sometimes been employed for the purpose of increasing the user safety of such attractions. Such coverings generally conceal the gap that would appear between, for example, the stationary platform and a moving part once that particular part began to move. However, such methods have not proved entirely successful. The coverings sometimes limit the degree of movement that the components of the apparatus can experience. They may not always be strong enough to prevent injury. In addition, they are subject to stress and fatigue and may fail without warning. Also, they may decrease the overall aesthetic appearance of the attraction for the user.

A further disadvantage of known simulator motion bases, particularly those used for military and commercial flight simulators, is that they generally employ apparatus in which the active elements that impart motion to the mechanism also bear the load of the user's weight. For example, in many aviation simulators, the entire simulator base is supported by the pistons that also impart the simulated motions. This is undesirable for several reasons. First, the active elements must exert sufficient force not only to move the platform and the user, but also to support their weight. This means that larger, more expensive active elements are required, and also that the lifespan of the active elements may be reduced. Second, a failure of the active elements while the apparatus is in motion could result in collapse of the platform and injury to the user.

Finally, in known motion bases, if rotational motion is imparted to the user, the center of rotation of the apparatus may not be coincident with the user's center of gravity. As a result, such an apparatus can cause nausea or other motion sickness for the user. In addition, if the user's center of gravity is not coincident with the center of rotation of the apparatus, higher torque is required to rotate the apparatus. In one known amusement attraction, the user is held within a sphere-like frame which is gimballed to a fixed support for rotation about multiple axes. Thus, the center of rotation of the apparatus is about the center of the sphere. In such an apparatus, if the center of rotation is not also about the user's center of gravity, the moment between the center of the sphere and the user's center of gravity would necessitate the application of higher torque to subject the user to motion. Likelihood of user nausea would also be increased, and the user's sense of immersion in the experience would be decreased by the unnatural motion.

Thus, it would be desirable to provide a motion base for an apparatus for subjecting a user to sensory experience that requires less force and torque to cause the base to move in a desired manner.

It would also be desirable to provide means for imparting motion to a motion base that contributes to prolonging the life of the apparatus.

It would also be desirable to provide a motion base that can be made from high strength materials at a reduced cost.

It would also be desirable to provide a motion base that can impart motion to a user in a manner that realistically corresponds to the user's input.

It would also be desirable to provide such a motion base that lessens the likelihood that the user will suffer nausea or other motion sickness, and that thereby increases the user's sense of immersion in a virtual world.

It would further be desirable to provide a motion base for an apparatus for subjecting a user to sensory experience that provides a high degree of safety for the user.

SUMMARY OF THE INVENTION

In view of the foregoing, it is an object of this invention to provide a motion base that requires less force and torque to cause the base to move in a desired manner.

It is also an object of this invention to provide means for imparting motion to a motion base that contributes to prolonging the life of the apparatus.

It is also an object of this invention to provide a motion base that can be made from high strength materials at a reduced cost.

It is also an object of this invention to provide a motion base that can impart motion to a user in a manner that realistically corresponds to the user's input.

It is also an object of this invention to provide such a motion base that lessens the likelihood that the user will suffer nausea or other motion sickness, and that thereby increases the user's sense of immersion in a virtual world.

It is a further object of this invention to provide a motion base for an apparatus for subjecting a user to sensory experience that provides a high degree of safety for the user.

In accordance with the invention, a motion base for apparatus for subjecting the user to sensory experience is provided. The motion base includes a platform having an upper surface for supporting the user, a first lower arcuate bearing portion having a first center and a first radius for supporting the platform for rotation about at least a first axis, a second lower arcuate bearing portion having a second radius for supporting the platform for rotation about at least a second axis, and a motion generator for moving the platform about at least one axis of rotation.

The first lower arcuate bearing portion may comprise a first pair of arcuate rails defined by longitudinally spaced apart radii of a right circular cylinder having a longitudinal axis extending in a first direction. The second lower arcuate bearing portion may comprise a second pair of arcuate rails defined by longitudinally spaced apart radii of a right circular cylinder having a longitudinal axis extending in a second direction substantially orthogonal to the first direction. A lower surface of the platform may bear upon the first pair of arcuate rails and the lower surfaces of the first pair of arcuate rails may bear upon the second pair of arcuate rails. The motion generator may further comprise a first drive for moving the platform relative to the first pair of arcuate rails and a second drive for moving the first pair of arcuate rails relative to the second pair of arcuate rails. The platform preferably supports the user so that the user's center of gravity is substantially coincident with the center of the first lower arcuate bearing portion and with the center of the second lower arcuate bearing portion.

In another embodiment, the first and second arcuate bearing portions may both be defined by a lower bearing surface of the platform, with the lower bearing surface defining a portion of a sphere. In this embodiment, the motion base further includes a support bowl having an upper bearing surface that also defines a portion of a sphere. The lower bearing surface of the platform rests upon the upper bearing surface for rotation of the platform about the first and second axes. Preferably, the user is supported on the platform such that his or her center of gravity is substantially coincident with the center of the sphere defined by the lower support surface. The support bowl may be provided with an opening through which the motion generator is connected.

The motion generator may further comprise a shaft that is connected through the opening in the support bowl to the platform, an X-Y table and a universal joint that connects the X-Y table to the shaft. The motion generator moves the platform about at least two axes of rotation that are substantially orthogonal to each other. The motion generator may further include a rotary table between the X-Y table and the universal table for moving the platform about a third axis of rotation that is substantially orthogonal to the other two axes of rotation.

A further embodiment of the motion generator of the motion base of the present invention includes at least one steerable friction wheel that bears against the platform through the opening in the support bowl and is driven so that the platform rotates about two substantially orthogonal axes of rotation. A second friction wheel may additionally be provided for moving the platform about a third axis of rotation that is substantially orthogonal to the other two axes of rotation.

In another embodiment, the first and second lower arcuate bearing portions of the motion base are again both portions of a spherical lower bearing surface of the platform, which is supported by at least three substantially point bearings located on a sphere having substantially the same radius as the lower bearing surface. Preferably, the user's center of gravity is substantially coincident with the center of the sphere. Either of the latter two of the aforementioned motion generators may be used with this embodiment.

BRIEF DESCRIPTION OF THE DRAWINGS

The above and other objects and advantages of the invention will be apparent from consideration of the following detailed description, taken in conjunction with the accompanying drawings, in which like reference characters refer to like parts throughout, and in which:

FIG. 4 is a side view of a third embodiment of the motion base of the present invention;

FIG. 5 is a side view of the apparatus shown in FIG. 4 in a different position;

DETAILED DESCRIPTION OF THE INVENTION

Figure 1:
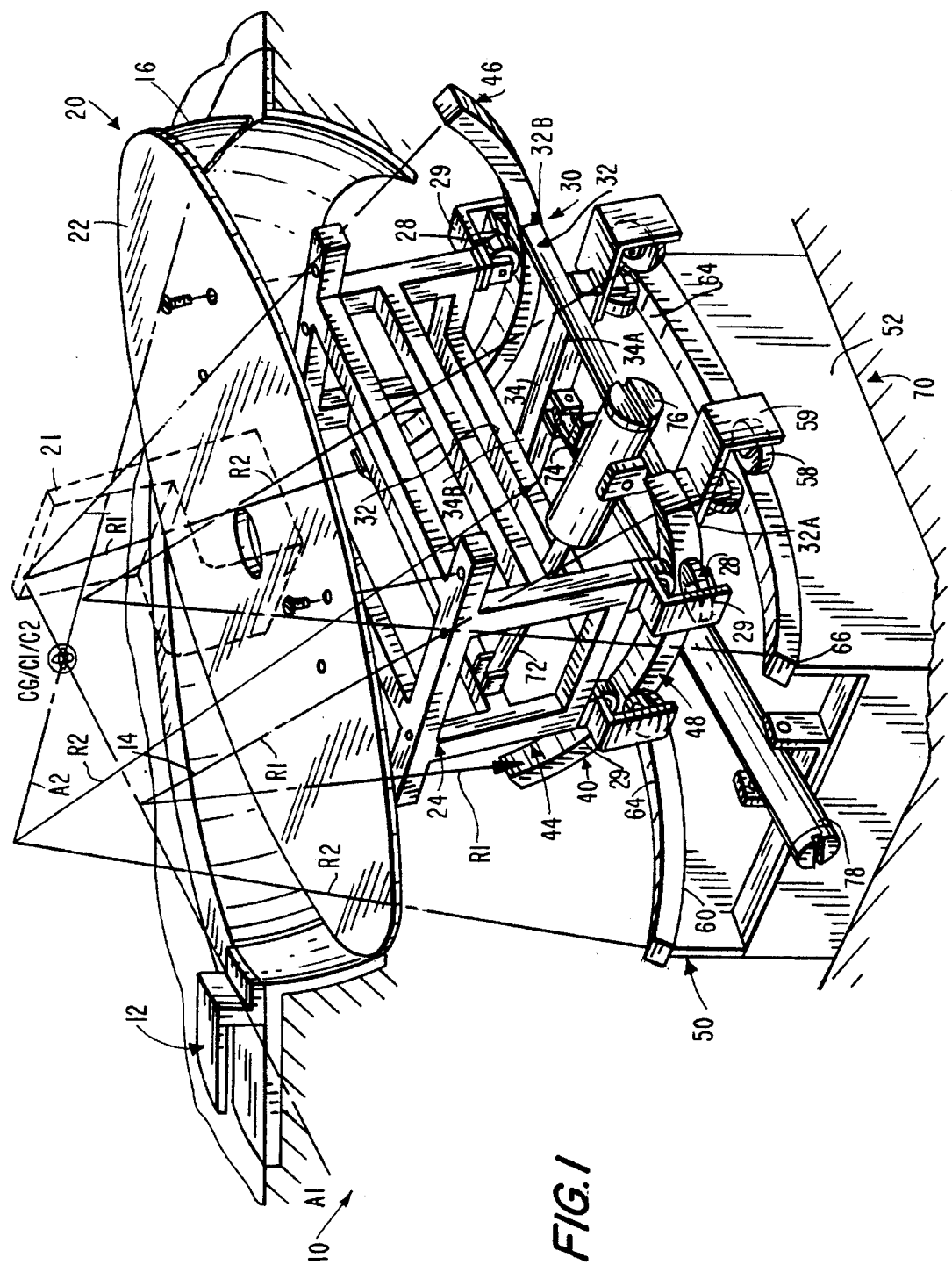
FIG. 1 is a perspective view of a first embodiment of the motion base of the present invention.

An example of a virtual reality simulation, which may preferably be implemented in a theme park setting, is a "magic carpet" ride. A participant of such a ride may maneuver a pointing device to control the "flight" of the magic carpet within a fantasy world which is viewed through an appropriate visual display device (preferably providing a wide field-of-view 3-D image). In response to movements of the pointing device provided by the user, the system may generate images appropriate for the direction, inclination, tilt and speed of the magic carpet flight. The user may be further positioned on a platform which may be moved in a manner that simulates the motion of the magic carpet. It is particularly important for the motion of the magic carpet to realistically correspond to the user's input from the pointing device, thereby enhancing the user's sense of immersion in the virtual world. Of course, the invention may be also used with any other type of virtual reality simulation requiring directional inputs in several degrees of freedom.

Previously known motion simulators have several limitations that are undesirable for a virtual reality theme park attraction. In particular, they may require skirtings around the apparatus in order to protect against injury. Also, they may be configured such that the active elements that impart motion to the apparatus must support the weight of the user, thereby requiring the apparatus to be made from higher cost materials, decreasing the life of the apparatus, and increasing the chance of injury to the user if failure occurs. Furthermore, if the user's center of gravity is not coincident with the center of rotation of the apparatus, the likelihood that the user will suffer nausea is increased.

In order to generate the motion of a virtual reality theme park attraction such as a magic carpet based upon the user's input, apparatus capable of rotation about three substantially orthogonal axes should preferably be provided.

The present invention relates to a motion base for such apparatus that preferably allows rotational motion about at least three separate, substantially orthogonal axes, alone or in combination. The motion base may be designed such that skirtings are not required to prevent injury from moving parts. Furthermore, the active elements of the motion base need not support the weight of the user; thus high strength, low cost materials may be used to construct the motion base. The motion base will also require less power to operate, and is likely to have a longer useful life as a result its active elements not being subjected to the load of the weight of the user and the platform itself. As a result, the need for a large, expensive inventory of parts is reduced, and maintenance costs are lowered.

In addition, by maintaining coincidence of the user center of gravity with the center of rotation of the apparatus, less torque is required to impart rotation, and the user is less likely to suffer from nausea, and will experience a greater sense of immersion in any virtual world presented to him or her.

Although such a device is ideally suited for a virtual reality system, especially in a theme park setting, it will be apparent that the present invention may be implemented in any application (military, commercial, etc.) where control of motion is useful.

FIG. 1 shows a first preferred embodiment of the motion base of the present invention. Motion base 10 of an apparatus (not shown), for example part of a virtual reality or other simulator-type theme park attraction, includes a platform 20 having an upper surface 22 and a lower surface 24. Platform 20 may also be provided with a user support structure 21 on its upper surface 22 that may take various physical forms as the theme of the particular attraction suggests. When the apparatus is motionless, upper surface 22 of platform 20 is level with a stationary raised floor 12 from which the user enters the apparatus. The components of motion base 10 of the present invention are located beneath stationary raised floor 12 of the apparatus. In the embodiment shown, platform 20 is preferably circular so that when its is in motion, its edge traces the surface of a sphere. Stationary raised floor 12 has an inner, preferably spherical, surface 14 that is shaped to receive upper surface 22 of platform 20 in close contact regardless of the degree of motion the upper surface 22 of platform 20 experiences. The apparatus is thus self-skirting to a user on platform 20. Flexible skirting 16 between upper surface 22 of platform 20 and stationary raised floor 12 may also be provided to ensure that any gap between upper surface 22 of platform 20 and stationary raised floor 12 that develops as motion base 10 moves is concealed, for the protection of those on platform 12.

Platform 20 is supported by a first lower arcuate bearing portion 30. First lower arcuate bearing portion 30 may include a first pair of arcuate rails 40 defined by longitudinally spaced apart radii R1 of first right circular cylinder having a first axis A1 extending through its center C1. Each of the first pair of arcuate rails 40 has upper surfaces 44, lower surfaces 46 and side surfaces 48. The longitudinal spacing between the first pair of arcuate rails 40 is maintained by spacer bars 32. Each spacer bar 32 is fixed at its two ends 32A, B to each of the first pair of arcuate rails 40. Cross spacer bar 34 is also provided for additional structural integrity. Cross spacer bar 34 is secured at each of its ends 34A, B to approximately the midpoint of each of spacer bars 32 such that cross spacer bar 34 is substantially orthogonal to each of spacer bars 32.

Lower surface 24 of platform 20 may take the form of a frame structure as shown in FIG. 1, or any other suitable type of structure, for providing support between the upper surface 22 of platform 20 and the upper surfaces 44 of first pair of arcuate rails 40. Lower surface 24 of platform 20 slidably bears upon upper surfaces 44 of first pair of arcuate rails 40. For example, as shown in FIG. 1, lower surface 24 of platform 20 may be provided with first wheels 28 supported by first wheel supports 29. First wheel supports 29 are fixed to lower surface 24 of platform 20. First wheel supports 29 may be connected to first wheels 28 in any manner,that allows first wheels 28 to roll freely along first pair of arcuate rails 40. First wheel supports 29 may be arranged so that first wheels 28 contact the side surfaces 48 of the first pair of arcuate rails 40, the upper surfaces 44 of the first pair of arcuate rails 40, or any combination of the side surfaces 48 and the upper surfaces 44. Upper surfaces 44 and side surfaces 48 of first pair of arcuate rails 40 may be grooved to receive first wheels 28 in order to minimize extraneous movements.

Alternatively, upper surfaces 44 or side surfaces 48 of first pair of arcuate rails could be provided with teeth for matingly engaging first wheels 28, which could also be provided with teeth. Any other suitable means known in the art to provide relative movement between two surfaces may be also employed for the purpose of slidably moving platform 20 with respect to first pair of arcuate rails 40.

Rotation of platform 20 about axis A1 is preferably provided by first shaft 72. First shaft 72 is preferably fixedly connected to lower surface 24 of platform 20. First shaft 72 is preferably driven by a first drive 76, which may be a hydraulic piston or any other drive means known in the art. When first drive 76 is in operation, first shaft 72 moves along the direction of second axis A2, causing first wheels 28 roll along the first pair of arcuate rails 40. The motion of first wheels 28 bearing upon first lower arcuate rails causes platform 20 to rotate about first axis A1.

Platform 20 is further supported by a second lower arcuate bearing portion 50. Second lower arcuate bearing portion 50 may be comprised of a second pair of arcuate rails 60 defined by longitudinally spaced apart radii R2 of second right circular cylinder having a second axis A2 extending through its center C2. Second axis A2 is preferably substantially orthogonal to first axis A1. Each of second pair of arcuate rails 60 has upper surfaces 64, lower surfaces 66, and side surfaces 68.

Preferably, first center C1 of first lower arcuate portion 30 is substantially coincident with second center C2 of second lower arcuate portion 50. In addition, it is preferable that the user be supported on the user support structure 21 so that the user's center of gravity CG is substantially coincident with the center C1 of first lower arcuate portion 30. User center of gravity CG will also be substantially coincident with the center C2 of second lower arcuate portion 50. In this manner, the likelihood of user nausea or other motion sickness is minimized. Coincidence of user center of gravity CG with centers C1 and C2 also eliminates any moment arm between user center of gravity CG and the center of rotation of platform 20, therefore requiring less torque to rotate platform 20.

Second lower arcuate bearing portion 50 also preferably includes a stationary base block 52. Lower surfaces 66 of second pair of arcuate rails 66 are fixedly attached to stationary base block 52.

Lower surfaces 46 of first pair of arcuate rails 40 bear upon the second pair of arcuate rails 60. For example, as shown in FIG. 1, first lower arcuate bearing portion 30 may be provided with second wheels 58 supported upon second wheel supports 59. Second wheel supports 59 are fixed to spacer bars 32 of first lower arcuate bearing portion 30. Second wheel supports 59 support second wheels 58 so that second wheels 58 contact the side surfaces 68 or the upper surfaces 64 of the second pair of arcuate rails 60. Upper surfaces 64 and side surfaces 68 of second pair of arcuate rails 60 may also be grooved to receive second wheels 58 in order to minimize extraneous movements. As with first wheel supports 29 and first wheels 28, any other suitable means known in the art to provide relative movement between two surfaces may be also employed for the purpose of slidably moving first lower arcuate bearing surface 30 with respect to second lower arcuate bearing portion 50.

Rotation of platform 20 about axis A2 is preferably provided by second shaft 74. Second shaft 74 is preferably fixedly connected to cross spacer bar 34 of first lower arcuate bearing portion 30. Second shaft 74 is preferably driven by a second drive 78, which may be a hydraulic piston or any other drive means known in the art. When second drive 78 is in operation, second shaft 74 reciprocates along the direction of first axis A1, causing second wheels 58 to roll along the upper surfaces 64 of second pair of arcuate rails 60. The motion of second wheels 28 bearing upon second lower arcuate rails 60 causes platform 20 to rotate about second axis A2.

As previously described, motion base 10 is provided with motion generator 70 in order to impart motion to platform 20 about first axis A1, second axis A2, or both axes. Motion generator 70 may be of any type generally known in the art. Preferably, motion generator 70 includes two separate drive means, a first drive 76 for moving platform 20 about first axis A1 and relative to first pair of arcuate rails 30, and a second drive 78 for moving first pair of arcuate rails 30 about second axis A2 and relative to second pair of arcuate rails 50. By providing two separate drive mechanisms, it is possible to selectively impart rotational motion to the motion base 10 about either first axis A1 or second axis A2, or a combination of both axes. Simultaneous operation of both first and second drives 76 and 78 imparts a two-degree-of-freedom motion to the platform 20. It is also possible to provide additional structure and drive means for imparting a third degree of freedom to platform 20. For example, the entire structure of FIG. 1 could be placed on a rotary table, or a rotary table could be inserted directly below platform 20 and above lower surface 24 of platform 20. Similarly, the structure of FIG. 1 can be placed on a table or other mechanism for imparting translational motion in one or more axes, if desired.

From the foregoing description, it can be seen that there is no need for active elements, such as pistons, to support the user's weight as the user is supported on platform 20. For this reason, the motion base 10 of the present invention is less costly to manufacture and operate. Additionally, motion base 10 of the present invention is safer for the user than apparatus in which active elements are required to support the platform. Specifically, the chance of catastrophic failure due to collapse of one or more of the active elements is substantially eliminated.

Figure 2:
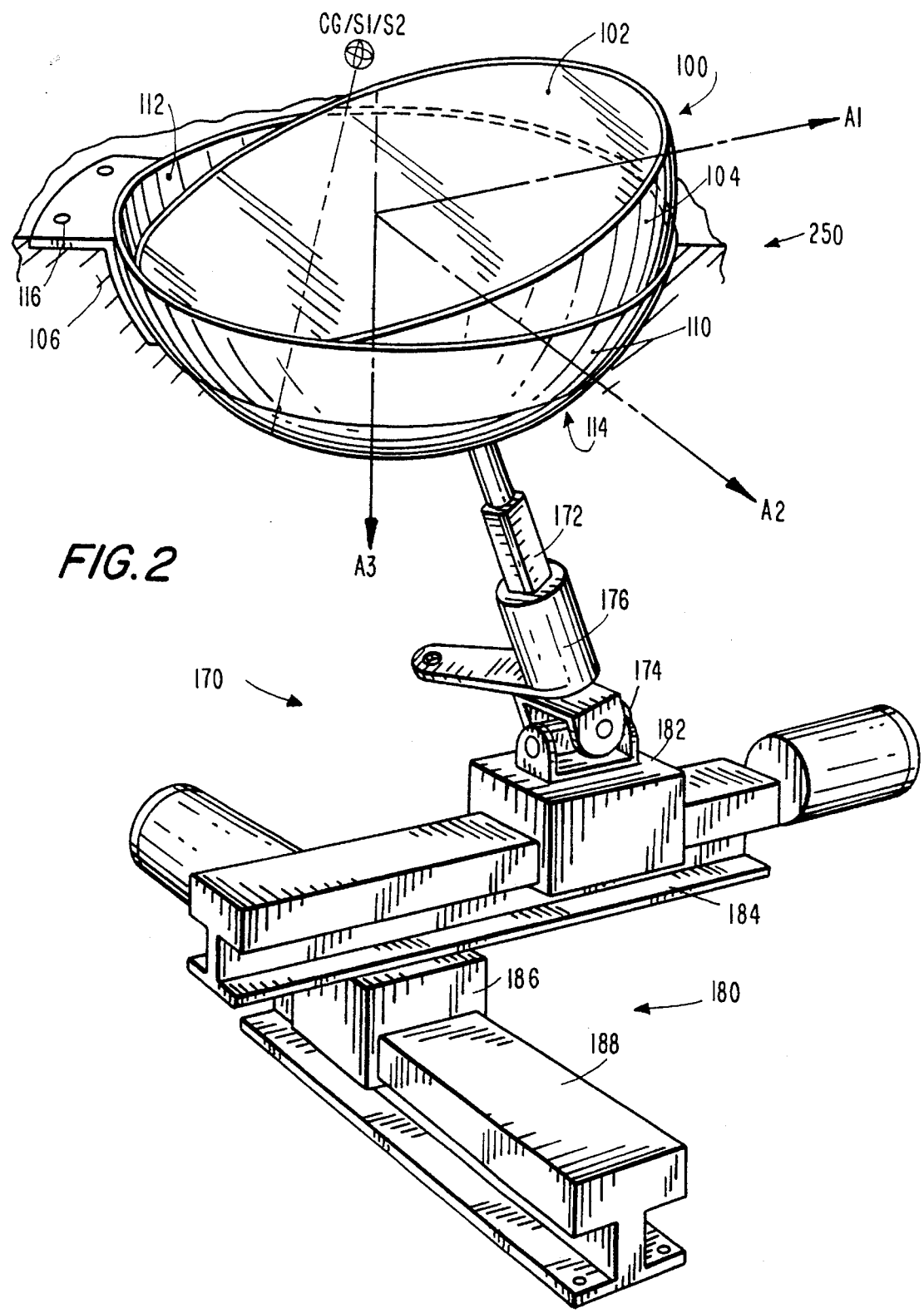
FIG. 2 is a perspective view of a second, preferred embodiment of the motion base of the present invention.
Figure 3:
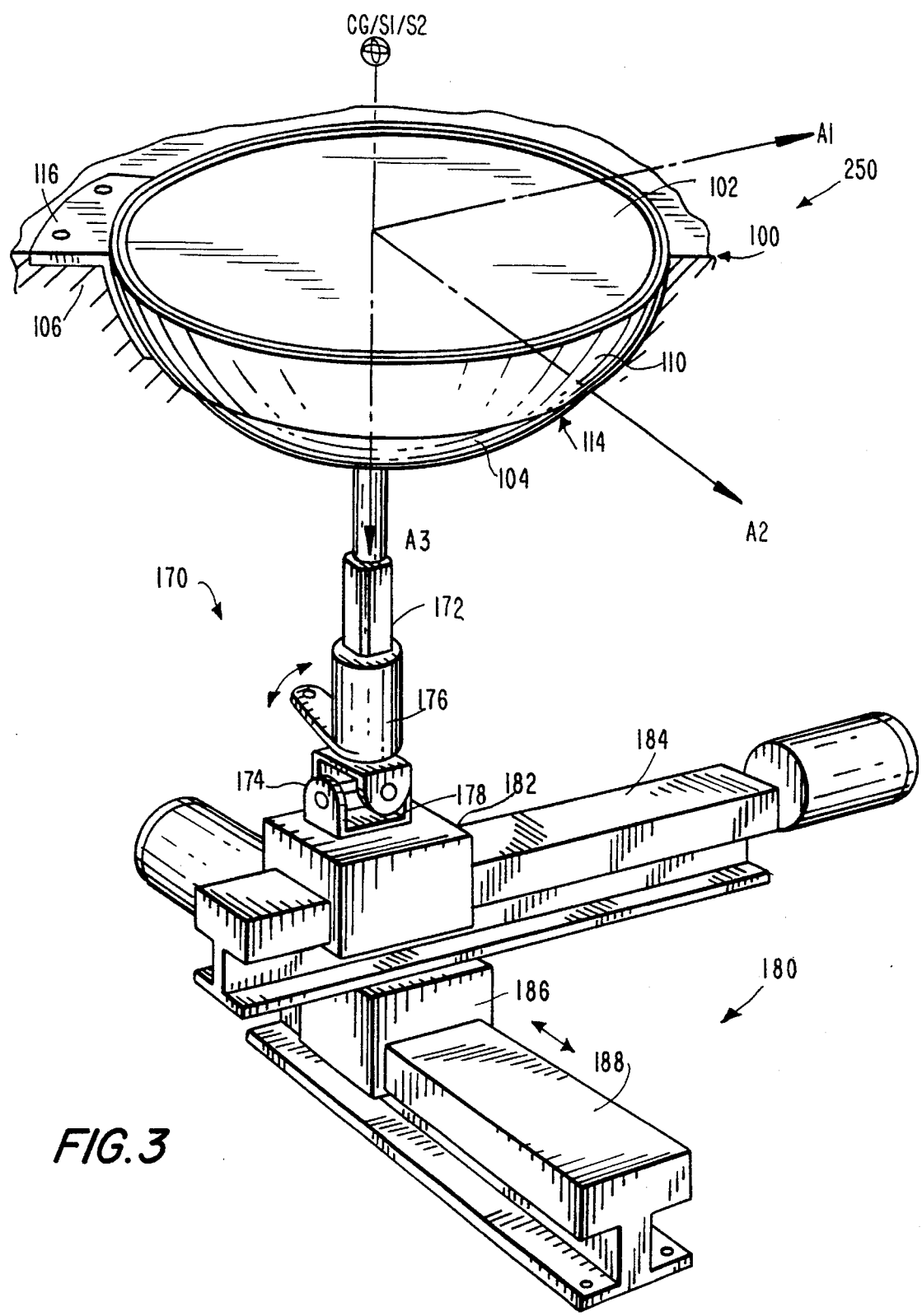
FIG. 3 is a perspective view of the apparatus shown in FIG. 2 in a different position.

A second, more preferred embodiment 250 of the present invention is shown in FIGS. 2 and 3. In this embodiment, platform 100 is provided with a level upper surface 102 or any other suitable upper surface and a lower bearing surface 104. Lower bearing surface 104 of platform 100 defines a portion of a sphere having a center S1. A user support structure (not shown in FIGS. 2 and 3), which could be molded or otherwise provided in any shape, may be attached to the upper surface 102 of platform 100.

Motion base 250 is also provided with a support bowl 110 having an upper bearing surface 112. Upper bearing surface 112 of support bowl 110 defines a portion of a sphere having a center S2. The radius of the sphere that is defined by the lower bearing surface 104 of platform 100 is substantially equal to the radius of the sphere that is defined by the support bowl 110 so that platform 100 nests in support bowl 110 with lower bearing surface 104 of platform 100 being supported by upper bearing surface 112 of support bowl 110. As shown in FIGS. 2 and 3, user center of gravity CG, center S1 of the sphere that is defined by lower bearing surface 104, and center S2 of the sphere that is defined by support bowl 110 are all substantially coincident.

Support bowl 110 is fixedly mounted to and is level with a raised floor 106 of the apparatus from which the user enters the apparatus including motion base 10. The various components of motion base 250 are located beneath raised floor 106. Support bowl 110 may be provided with a flange 116 for fixedly mounting it to raised floor 106. Alternatively, a support structure (not shown) may be provided for securing support bowl 110 from the floor (not shown) beneath motion base 250. Support bowl 110 bears the load of the user's weight, thereby eliminating the need for the active elements of motion base 250 to support the user's weight.

Preferably, the user support structure is positioned such that the user's center of gravity CG is substantially coincident with the center S1 of the sphere that is defined by the lower bearing surface 104 of platform 100 and the center S2 of the sphere that is defined by support bowl 110. Coincidence of S1 and S2 with each other and with the user's center of gravity CG minimizes the likelihood that the user will experience nausea or other motion sickness. Coincidence of user center of gravity CG with center S1 also eliminates any moment arm between user center of gravity CG and the center of rotation of platform 20, therefore requiring less torque to rotate platform 20.

Support bowl 110 may be provided with an opening 114 through which lower bearing surface 104 of platform 100 protrudes. Preferably, the opening 114 in support bowl 110 subtends a maximum arc length at most one half of a maximum arc length subtended by the lower bearing surface 104 of platform 100. In this manner, exposure of opening 114 of support bowl 110 is prevented even when motion generator 170 is at its maximum excursion. Therefore, as more clearly shown in FIG. 2, when platform 100 moves relative to support bowl 110, there is no gap created between the two, thereby eliminating the need for a flexible skirt and reducing the chance of injury to a user. Moreover, no openings are created that might subject someone on raised floor 106 to possible injury. This embodiment is thus self-skirting both as to those on platform 100 and those on raised floor 106.

Motion of platform 100 with respect to support bowl 110 may be facilitated by providing a friction-reducing material on either upper bearing surface 112 of support bowl 110 or lower bearing surface 104 of platform 100. For example, the friction-reducing material may be a lubricant, a roller structure, or a structure of low friction material having a plurality of spaced apart points (e.g., a matrix of nylon barbs similar to the hook portions of the hook-and-loop-type fastener material commonly known as VELCRO®), for contacting whichever of the upper bearing surface 112 of support bowl 110 or lower bearing surface 104 of platform 100 that is not provided with the friction-reducing material. Any other means for reducing friction that is known in the art may also be provided for the purpose of reducing friction between upper bearing surface 112 of support bowl 110 and lower bearing surface 104 of platform 100.

Motion generator 170 of motion base 250 shown in FIGS. 2 and 3 preferably includes shaft 172, X–Y table 180, and universal joint 174 that connects shaft 172 to X–Y table 180. Shaft 172 is preferably connected to platform 100 through opening 114 of support bowl 110 along axis A3 running through center S2 of the sphere defined by support bowl 110, and by center S1 of lower bearing surface 104 of platform 100. Shaft 172 is extendable (e.g., telescoping) so that as X–Y table 180 moves, it does not cause support bowl 110 to translate.

X–Y table 180 preferably includes first slider block 182, first rod 184, second slider block 186, and second rod 188. First rod 184 lies along the direction of axis A1. First slider block 182 is fixed at its upper end to the base 178 of universal joint 174. First slider block 182 is fitted around first rod 184 and is freely moveable over first rod 184 in the direction of axis A1.

Second slider block 186 is fixedly attached at its upper end to the lower end of first rod 184. Second rod 188 lies along the direction of axis A2 and is fixedly secured to the floor or other stationary area upon which X–Y table 180 rests. Second slider block 186 is fitted around second rod 188 and is freely moveable over second rod 188 in the direction of axis A2.

Motion generator 170 may also include a rotary table 176. Rotary table 176 is attached between universal joint 174 and X–Y table 180. Rotary table 176 and X–Y table 180 are provided with any suitable type of drive means known in the art (not shown).

The foregoing arrangement enables translational motion along two axes (axes A1 and A2 as shown in FIGS. 2 and 3) to be felt by the user, who is supported upon platform 100, as rotational motion about the same two axes, as will be apparent from the following description of the operation of motion base 250. In operation, the drive means of motion generator 170 may cause translational motion of first slider block 182 along first rod in the direction of axis A1. As first slider block 182 experiences translational motion, base 178 of universal joint 174, which is fixed to first slider block 182, also translates along the direction of axis A1. As universal joint 174 translates along an axis parallel to axis A1, the end of shaft 172 connected to universal joint 174 moves along the same axis while extending in length, causing platform 100 to rotate about an axis parallel to axis A2.

The drive means of motion generator 170 may also cause translational motion of second slider block 186, first rod 184, and first slider block 182 along second rod 188 along the direction of axis A2. As second slider block 186 experiences translational motion, base 178 of universal joint 174 also translates along the direction of axis A2. As universal joint 174 translates along an axis parallel to axis A2, the end of shaft 172 connected to universal joint 174 moves along the same axis while extending in length, causing platform 100 to rotate about an axis parallel to axis A1.

The drive means of motion generator 170 can also drive rotary table 176, thereby rotating shaft 172, which causes upper surface 102 of platform 100 to rotate about an axis parallel to axis A3.

It is apparent from the foregoing description that simultaneous movement of first slider block 182, second slider block 186, and rotary table 176 causes resultant motion of platform 100 with components of rotation about axes parallel to all three axes A1, A2 and A3. The magnitude of each component is dependent upon the relative magnitudes of the motions of first slider block 182, second slider block 186, and rotary table 176. FIG. 2 shows an example of the type of motion that platform 100 experiences when all of first slider block 182, second slider block 186, and rotary table 176 are driven.

Figure 6:
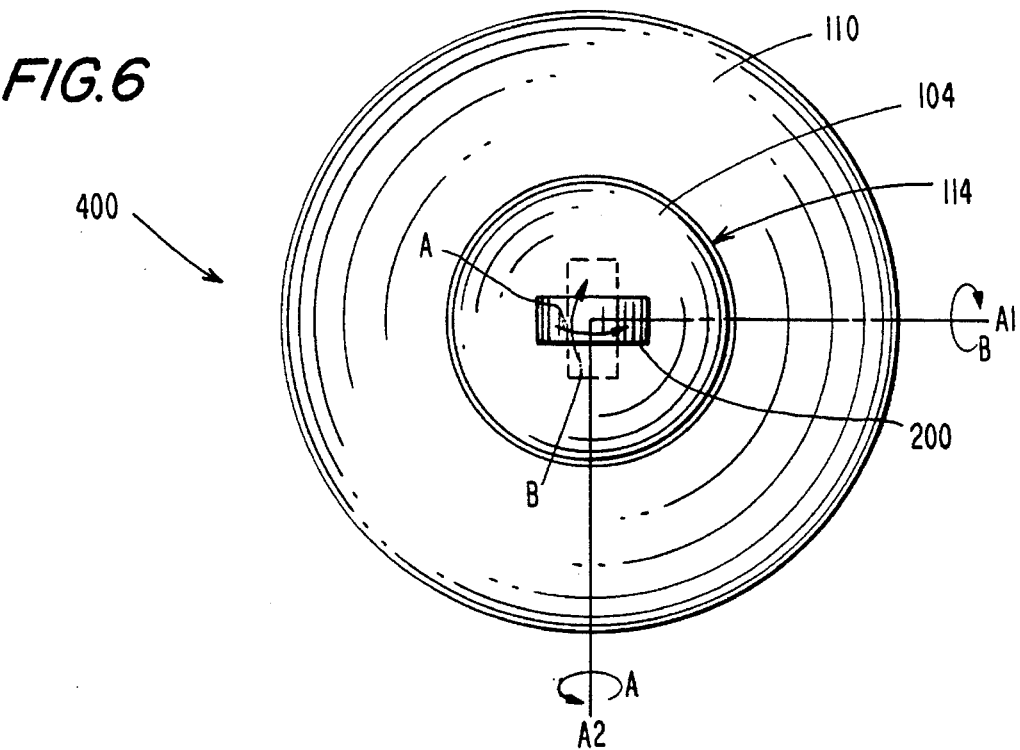
FIG. 6 is a bottom view of the apparatus shown in FIGS. 4 and 5.

A third preferred embodiment 400 of the present invention is shown in FIGS. 4–6. As shown in FIG. 4, motion generator 470 includes at least one steerable friction wheel 200 that bears against lower bearing surface 104 of platform 100 through opening 114 in support bowl 110 and at least one motor 210 for driving steerable friction wheel 200. Steerable friction wheel 200 may be connected to motor 210 by any means known in the art, for example by a first drive shaft 202, as shown in FIG. 4.

As in the case of the motion base 250, platform 100 of motion base 400 may be provided with a user support structure (not shown in FIGS. 4–6) on its upper surface 102 such that the user's center of gravity CG is substantially coincident with the center S1 of the sphere that is defined by the lower bearing surface of platform 100. S1 is also the center of rotation of platform 100.

Support bowl 110 may again be fixedly supported by any means known in the art. For example, support bowl 110 may be fixedly anchored to platform 106 by any means known in the art. As before, support bowl 110 remains fixed regardless of what motion platform 100 experiences. For this reason, first steerable friction wheel 200, first drive shaft 202 and first motor 210 that cause platform 100 to move need not bear any of the load of the user's weight. Therefore, platform 100 and support bowl 110 may be made from low cost, high strength materials such as fiberglass, while first steerable friction wheel 200, first shaft 202 and first motor 210 will have a longer expected life than if those components were subjected to the load of platform 100 and the user's weight.

Platform 100 may be rotated about two axes by first steerable friction wheel 200. First steerable friction wheel 200 is driven by first drive shaft 202 and first motor 210 or by any means known in the art. FIG. 4 shows first steerable wheel 200, first drive shaft 202 and first motor 210 configured so as to permit rotation of platform 100 about axes A1 and A2. First friction steerable wheel 200 could be located anywhere on surface 104. As shown in FIGS. 4–6, a preferred location for first steerable friction wheel 200 is at the bottom center of surface 104.

FIG. 6 shows a bottom view of motion base 400 of FIGS. 4 and 5, and more clearly shows two positions of first steerable friction wheel 200. When first steerable friction wheel 200 is in position A (shown in solid lines) it rotates about axis A2, thereby causing platform 100 to also rotate about axis A2. When first steerable friction wheel 200 is in position B (shown in dashed lines), it rotates about axis A1, thereby causing platform to also rotate about axis A1. At positions in between positions A and B, first steerable friction wheel 200 would cause motion with components about both axes A1 and A2.

If rotation about axis A3 in addition to either or both of axes A1 and A2 is desired, support bowl 110 may be additionally provided with a second opening 114A, as shown in FIG. 5. Motion generator 470 would then additionally include a second friction wheel 220 that bears against lower bearing surface 104 of platform 100 through second opening 114A in support bowl 110 and a second motor 230 for driving second friction wheel 220. Second friction wheel 220 may be driven by second drive shaft 222 (shown in end view in FIG. 5) or by any other means known in the art. Rotation of second friction wheel 220 causes platform 100 to rotate about axis A3, as shown in FIG. 5.

Simultaneous rotation of first steerable friction wheel 200 and second friction wheel 220 causes the resultant rotation of platform 100 to have a component of rotation about any two of the axes A1, A2, A3. Second friction wheel 220 could also be steerable; however, this merely provides redundant control of rotation about one of axes A1 and A2.

User center of gravity CG will always remain substantially coincident with the center S1 of the sphere defined by the lower arcuate bearing surface of platform 100 of motion base 400.

Figure 7:
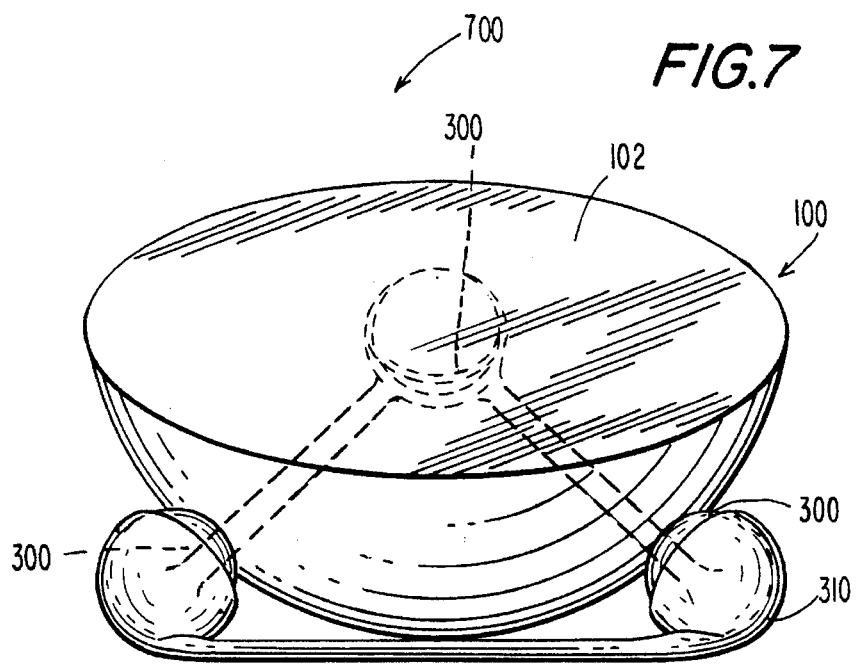
FIG. 7 is a perspective view of a fourth embodiment of the motion base of the present invention.

Another preferred embodiment of the present invention is shown in FIG. 7. Motion base 700 includes a platform 100 having a lower bearing surface 104, and at least three point bearings 300 which bear against lower bearing surface 104 of platform 100 to support platform 100 in place of support bowl 110 of motion base 250, 400. Point bearings 300 are preferably located around the periphery of platform 100 in the configuration of an equilateral triangle, and may be supported by any support means known in the art such as frame 310, preferably so that they are freely rotatable. Point bearings 300 may be of any type known in the art, such as large ball bearings. Either of motion generators 170, 470 may be used to move platform 100 of motion base 700 as described above. While motion base 700 as shown is not self-skirting, it does have the other advantages of the previous embodiments of the invention.

Thus it is seen that a motion base for an apparatus for subjecting the user to sensory experience having a motion generator for moving a platform about at least one axis of rotation and which need not support the weight of the apparatus and the user has been described. One skilled in the art will appreciate that the present invention can be practiced by other than the described embodiments, which are presented for the purposes of illustration and not of limitation, and the present invention is limited only by the claims which follow.

What is claimed is:

1. A motion base for apparatus for subjecting a user to a sensory experience, said motion base comprising:
   a platform having an upper surface for supporting said user;
   a first lower arcuate bearing portion having a first center and a first radius for supporting said platform for rotation about at least a first axis, said first arcuate bearing portion comprising a first pair of arcuate rails defined by longitudinally spaced apart radii of a first right circular cylinder having a longitudinal axis extending in a first direction;
   a second lower arcuate bearing portion having a second center and a second radius for supporting said platform for rotation about at least a second axis, said second arcuate bearing portion comprising a second pair of arcuate rails defined by longitudinally spaced apart radii of a second right circular cylinder having a longitudinal axis extending in a second direction substantially orthogonal to said first direction; and
   a motion generator for moving said platform about at least one axis of rotation; wherein:
   a lower surface of said platform bears on said first pair of arcuate rails; and
   lower surfaces of said first pair of arcuate rails bear on said second pair of arcuate rails.

2. The motion base of claim 1 wherein said first axis and said second axis are substantially orthogonal to one another.

3. The motion base of claim 1 wherein said platform comprises a user support structure for supporting said user with said user's center of gravity substantially coincident with said center of said first lower arcuate bearing portion.

4. The motion base of claim 1 wherein said center of said second arcuate bearing portion is substantially coincident with said user's center of gravity and said center of said first lower arcuate bearing portion.

5. The motion base of claim 1 wherein said longitudinal axis of said second right circular cylinder substantially intersects said longitudinal axis of said first right circular cylinder.

6. The motion base of claim 1 wherein said motion generator comprises:
   a first drive for moving said platform relative to said first pair of arcuate rails; and
   a second drive for moving said first pair of arcuate rails relative to said second pair of arcuate rails.

7. A motion base for apparatus for subjecting a user to a sensory experience, said motion base comprising:
   a platform having an upper surface for supporting said user;
   a first pair of arcuate rails defined by longitudinally spaced apart radii of a first right circular cylinder having a longitudinal axis extending in a first direction; and
   a second pair of arcuate rails defined by longitudinally spaced apart radii of a second right circular cylinder having a longitudinal axis extending in a second direction substantially orthogonal to said first direction; wherein:
   a lower surface of said platform bears on said first pair of arcuate rails; and
   lower surfaces of said first pair of arcuate rails bear on said second pair of arcuate rails.

8. The motion base of claim 7 wherein said longitudinal axis of said second right circular cylinder substantially intersects said longitudinal axis of said first right circular cylinder.

9. The motion base of claim 8 wherein said upper surface of said platform comprises a user support structure for supporting said user with said user's center of gravity substantially coincident with said axes of said first and second right circular cylinders.

10. The motion base of claim 7 further comprising a motion generator for moving said platform about at least one axis of rotation.

11. The motion base of claim 10 wherein said motion generator comprises:
    a first drive for moving said platform relative to said first pair of arcuate rails; and
    a second drive for moving said first pair of arcuate rails relative to said second pair of arcuate rails.

* * * * *